(12) United States Patent
Harada et al.

(10) Patent No.: US 9,186,633 B2
(45) Date of Patent: Nov. 17, 2015

(54) METHOD FOR PRODUCING POROUS THERMOSETTING RESIN SHEET, POROUS THERMOSETTING RESIN SHEET AND COMPOSITE SEMIPERMEABLE MEMBRANE USING SAME

(75) Inventors: Noriaki Harada, Ibaraki (JP); Atsushi Hiro, Ibaraki (JP); Katsumi Ishii, Ibaraki (JP); Yoshihide Kawaguchi, Ibaraki (JP); Atsuko Mizuike, Ibaraki (JP); Osamu Hayashi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 1179 days.

(21) Appl. No.: 13/125,639

(22) PCT Filed: Oct. 23, 2009

(86) PCT No.: PCT/JP2009/068235
§ 371 (c)(1),
(2), (4) Date: Apr. 22, 2011

(87) PCT Pub. No.: WO2010/047383
PCT Pub. Date: Apr. 29, 2010

(65) Prior Publication Data
US 2011/0192788 A1    Aug. 11, 2011

(30) Foreign Application Priority Data

Oct. 23, 2008    (JP) .................. 2008-273466
Oct. 21, 2009    (JP) .................. 2009-242653

(51) Int. Cl.
*B01D 69/12*    (2006.01)
*B01D 71/56*    (2006.01)
(Continued)

(52) U.S. Cl.
CPC ............... *B01D 71/56* (2013.01); *B01D 69/12* (2013.01); *C08J 5/18* (2013.01); *B01D 61/025* (2013.01);
(Continued)

(58) Field of Classification Search
CPC ............. B01D 2323/18; B01D 61/025; B01D 2323/225; B01D 2323/42; B01D 71/56; B01D 69/12; C08J 2471/00; C08J 2300/24; C08J 5/18; C08J 2201/046; C08J 2363/00
USPC ............ 210/500.38; 525/10, 31, 17, 396, 922, 525/926, 927; 524/909
See application file for complete search history.

(56) References Cited

U.S. PATENT DOCUMENTS 4,277,344 A    7/1981    Cadotte
4,520,044 A    5/1985    Sundet
(Continued)

FOREIGN PATENT DOCUMENTS

CN    1458860    11/2003
JP    55-147106 A    11/1980
(Continued)

OTHER PUBLICATIONS

First Office Action dated May 29, 2012 issued by the State Intellectual Property Office of People's Republic of China in corresponding patent application No. 200980142522.2.
(Continued)

*Primary Examiner* — Fred Prince
(74) *Attorney, Agent, or Firm* — Knobbe, Martens, Olson & Bear LLP

(57) ABSTRACT

Disclosed is a method for easily producing a long porous thermosetting resin sheet which has no resin coating film on the surface. Also disclosed are a porous thermosetting resin sheet produced by the method, and a composite semipermeable membrane having excellent chemical resistance and practical water permeability and salt-blocking property. The porous thermosetting resin sheet can be produced by forming a cylindrical or columnar resin block which is composed of a cured product of a thermosetting resin composition containing a thermosetting resin, a curing agent and a porogen; then forming a long thermosetting resin sheet by cutting the surface of the resin block at a certain thickness; and then removing the porogen from the thermosetting resin sheet.

21 Claims, 2 Drawing Sheets

(51) Int. Cl.
*C08J 5/18* (2006.01)
*B01D 61/02* (2006.01)

(52) U.S. Cl.
CPC ....... *B01D 2323/18* (2013.01); *B01D 2323/225* (2013.01); *B01D 2323/42* (2013.01); *C08J 2201/046* (2013.01); *C08J 2300/24* (2013.01); *C08J 2363/00* (2013.01); *C08J 2471/00* (2013.01); *Y10T 428/249921* (2015.04); *Y10T 428/269* (2015.01)

(56) References Cited

U.S. PATENT DOCUMENTS

| | | | |
|---|---|---|---|
| 4,529,646 | A | 7/1985 | Sundet |
| 4,761,234 | A | 8/1988 | Uemura et al. |
| 4,872,984 | A | 10/1989 | Tomaschke |
| 4,889,636 | A | 12/1989 | Perry et al. |
| 4,948,507 | A | 8/1990 | Tomaschke |
| 5,178,766 | A | 1/1993 | Ikeda et al. |
| 2003/0036085 | A1 | 2/2003 | Salinaro et al. |
| 2003/0066805 | A1* | 4/2003 | Andou et al. ......... 210/754 |
| 2003/0183576 | A1 | 10/2003 | Ohara et al. |
| 2004/0222146 | A1 | 11/2004 | Hirose et al. |
| 2007/0190880 | A1 | 8/2007 | Dubrow et al. |
| 2008/0020192 | A1* | 1/2008 | Yen et al. .......... 428/220 |
| 2008/0149561 | A1 | 6/2008 | Chu |
| 2008/0210626 | A1 | 9/2008 | Tsujioka et al. |
| 2010/0323573 | A1 | 12/2010 | Chu et al. |

FOREIGN PATENT DOCUMENTS

| | | |
|---|---|---|
| JP | 61-42308 A | 2/1986 |
| JP | 62-121603 A | 6/1987 |
| JP | 63-218208 A | 9/1988 |
| JP | 2-187135 A | 7/1990 |
| JP | 4-94726 A | 3/1992 |
| JP | 2000-240579 A | 9/2000 |
| JP | 2001-181436 A | 7/2001 |
| JP | 2001-341138 A | 12/2001 |
| JP | 2003-96229 A | 4/2003 |
| JP | 2004-330042 A | 11/2004 |
| JP | 2004-338208 A | 12/2004 |
| JP | 2008-13672 A | 1/2008 |
| JP | 2008-515668 | 5/2008 |
| WO | WO 2006/073173 A1 | 7/2006 |
| WO | WO 2007/001405 | 1/2007 |

OTHER PUBLICATIONS

Rejection Decision dated Jul. 3, 2013 issued by the State Intellectual Property Office of People's Republic of China in corresponding patent application No. 200980142522.2.
Notice of Final Rejection dated Sep. 26, 2013 in corresponding Korean patent application No. 10-2011-7011526.
Notification of Reasons for Refusal dated Dec. 10, 2013 in corresponding Japanese patent application No. 2009-242653.
Translation of the International Preliminary Report on Patentability from the International Bureau, dated May 26, 2011 in corresponding application No. PCT/JP09/068235.
Notice of Preliminary Rejection dated Feb. 20, 2013 in corresponding Korean patent application No. 10-2011-7011526.
Second Office Action dated Jan. 5, 2013 issued by the State Intellectual Property Office of People's Republic of China in corresponding patent application No. 200980142522.2.
Chinese Reexamination Notice dated Feb. 15, 2015 in corresponding to Chinese Patent Application No. 20098014522.2.
Japanese Decision of Refusal dated Jul. 1, 2014 in corresponding Japanese Patent Application No. 2009-242653.

* cited by examiner

US 9,186,633 B2

METHOD FOR PRODUCING POROUS THERMOSETTING RESIN SHEET, POROUS THERMOSETTING RESIN SHEET AND COMPOSITE SEMIPERMEABLE MEMBRANE USING SAME

This application is the U.S. National Phase under 35 U.S.C. §371 of International Application No. PCT/JP2009/068235, filed Oct. 23, 2009, which claims priority to Japanese Patent Application No. 2008-273466 filed Oct. 23, 2008 and Japanese Patent Application No. 2009-242653 filed Oct. 21, 2009. The International Application was not published in English under PCT Article 21(2).

TECHNICAL FIELD

The present invention relates to a porous thermosetting resin sheet and a method for producing the same. The present invention also relates to a composite semipermeable membrane composed of a skin layer and a porous thermosetting resin sheet for supporting the skin layer. These porous thermosetting resin sheets can be used suitably as a separation membrane or a support for a composite semipermeable membrane. The composite semipermeable membranes are suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the membrane can be used for concentration of active ingredients in foodstuffs usage, for an advanced water treatment, such as removal of harmful component in water purification and sewage usage etc.

BACKGROUND ART

Recently, composite semipermeable membrane, in which a skin layer including polyamides obtained by interfacial polymerization of polyfunctional aromatic amines and polyfunctional aromatic acid halides is formed on a porous support, have been proposed (Patent document 1). A composite semipermeable membrane, in which a skin layer including a polyamide obtained by interfacial polymerization of a polyfunctional aromatic amine and a polyfunctional alicyclic acid halide is formed on a porous support, has also been proposed (Patent document 2).

The porous supports include, for example, those in which a microporous layer having a substantial separation function is formed on a surface of a substrate. The substrate includes, for example, a woven fabric, a nonwoven fabric, a mesh net and a foaming sintered sheet, made of materials such as polyester, polypropylene, polyethylene, polyamide and the like. In addition, materials for forming the microporous layer include various materials, for example, such as polyaryl ether sulfones (e.g. polysulfones, polyether sulfones), polyimides and polyvinylidene fluorides, and particularly from the viewpoint of chemical, mechanical and thermal stability, polysulfones and polyaryl ether sulfones have been preferably used.

As for these composite semipermeable membranes, chemical resistance that can endure various oxidants, particularly chlorine washing, has been required as a result of pursuit of low cost due to more stable operability and simple usability as well as prolongation of membrane lifetime, in various water treatments including desalination plants.

The composite semipermeable membrane has a practical chemical resistance, but it may not be said that such a membrane has chemical resistance to endure against routine or intermittent chlorine sterilization. Therefore, development of a composite semipermeable membrane having higher chemical resistance as well as a practical level of water permeability and salt-blocking property, particularly development of a porous support exhibiting an excellent chemical resistance, has been desired.

On the other hand, a porous cured epoxy resin that is a separation medium capable of selectively distinguishing a substance having a plane molecular structure, such as dioxin or PCB (polychlorinated biphenyl), and capable of having a low back pressure, as well as able being processed on a large scale, has been developed (Patent document 3). The porous cured epoxy resin is a non-particle aggregation type porous object including a columnar three-dimensional branched structure, wherein the porous object has a porosity of 20 to 80% and an average pore diameter of 0.5 to 50 µm.

The above-mentioned porous cured epoxy resin can be produced by dissolving an epoxy resin and a curing agent in a porogen (a pore-forming agent) to prepare a mixed solution; applying the mixed solution onto a substrate, followed by heating to form a three-dimensional branched structure via a crosslinking reaction; and then removing the porogen. In the case of such a production method, a resin coating film without pores was easy to be formed on the surface of a porous body, and it was necessary to remove the resin coating film for use as a separation medium, thus causing a problem that the production process became complicated.

On the other hand, a method for producing a modified polytetrafluoroethylene film which includes modifying a lumpy molded product of polytetrafluoroethylene powders and cutting the modified product to form a long film has been proposed for the purpose of providing a method capable of producing a modified PTFE film without accompanying deterioration in mechanical physical properties thereof and requiring much capital investment (Patent Document 4).

In addition, a method of producing a chip seal for use in a scroll compressor has been proposed that includes the steps of molding a resin composition containing a fluorine resin as a main component into a columnar or cylindrical molded product, and molding the molded product into a sheet shape state by using a skiving process (Patent Document 5).

Moreover, a method for producing a sintered polytetrafluoroethylene porous sheet has been proposed that includes compression-molding polytetrafluoroethylene powders to form a cylindrical preliminary compression-molded product; hanging horizontally the preliminary compression-molded product by a mandrel; sintering the product to form a sintered porous molded product; and then subjecting the sintered porous molded product to a cutting process (Patent Document 6).

PRIOR ART DOCUMENTS

Patent Documents

Patent Document 1: Japanese Unexamined Patent Publication No. 2-187135
Patent Document 2: Japanese Unexamined Patent Publication No. 61-42308
Patent Document 3: International publication No. WO 2006/073173 Pamphlet
Patent Document 4: Japanese Unexamined Patent Publication No. 2004-338208
Patent Document 5: Japanese Unexamined Patent Publication No. 2000-240579
Patent Document 6: Japanese Unexamined Patent Publication No. 2001-341138

SUMMARY OF THE INVENTION

Problems to be Solved by the Invention

An object of the present invention is to provide a method for easily producing a long porous thermosetting resin sheet which has no resin coating film on the surface, as well as to provide a porous thermosetting resin sheet produced by the method. In addition, it is another object of the present invention to provide a composite semipermeable membrane having not only excellent chemical resistance but also practical water permeability and salt blocking property.

Means for Solving the Problems

As a result of intensive studies to achieve the above objects, the present inventors have found that an objective porous support can be easily produced by the following method, and have completed the present invention.

The present invention relates to a method for producing a porous thermosetting resin sheet, including the steps of forming a cylindrical or columnar resin block composed of a cured product of a thermosetting resin composition containing a thermosetting resin, a curing agent and a porogen; forming a long thermosetting resin sheet by cutting the surface of the resin block at a certain thickness; and then removing the porogen from the thermosetting resin sheet.

According to the above method, it is possible to easily produce a long porous thermosetting resin sheet having no resin coating film on the surface.

It is preferred to carry out the cutting process while rotating the cylindrical or columnar resin block around the cylindrical or columnar axis.

It is necessary to remove the porogen after producing a thermosetting resin sheet, whereby a porous smooth and continuous thermosetting resin sheet can be obtained. It is difficult to obtain the porous smooth and continuous thermosetting resin sheet according to the method where the cutting is performed after removing the porogen from the resin block, because the resin block becomes fragile and malfunction may occur in the pores at the time of cutting.

In the production method of the present invention, it is preferable to use an epoxy resin as a thermosetting resin. A porous epoxy resin sheet is excellent in chemical resistance because the porous epoxy resin sheet is made of a crosslinked epoxy resin, and such a porous epoxy resin sheet exhibits high strength (high pressure resistance) although it has a high porosity due to the continuous three-dimensional network skeleton.

In the production method of the present invention, it is preferable to use polyethylene glycol as a porogen.

The porous thermosetting resin sheet obtained by the production method of the present invention is having pores connected with each other. The average pore diameter of the porous thermosetting resin sheet is preferably 0.01 to 0.4 µm from the viewpoint of water permeability, salt blocking property, and formation of a uniform skin layer on the surface of the sheet.

In addition, the present invention relates to a composite semipermeable membrane, wherein a skin layer is formed on the surface of the above-mentioned porous thermosetting resin sheet. It is preferable for the skin layer to be formed by a material including a polyamide-based resin, in order to obtain practical water permeability and salt blocking property.

BRIEF DESCRIPTION OF THE DRAWINGS

FIG. 3-1 shows a cross-sectional SEM photograph (800×) of the composite semipermeable membrane obtained in Example 5.

FIG. 3-2 shows a cross-sectional SEM photograph (4000×) of the composite semipermeable membrane obtained in Example 5.

MODE FOR CARRYING OUT THE INVENTION

Figure 1:
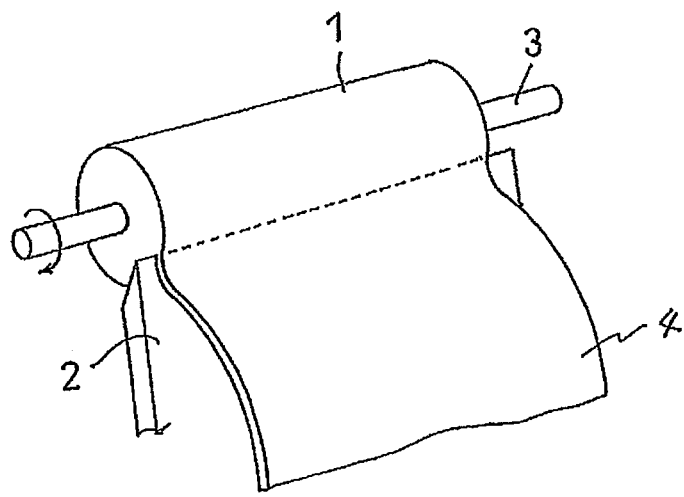
FIG. 1 is a schematic view showing a step to slice a cylindrical resin block using a slicer.

The method for producing a porous thermosetting resin sheet according to the present invention includes the steps of forming a cylindrical or columnar resin block composed of a cured product of a thermosetting resin composition containing a thermosetting resin, a curing agent and a porogen; forming a long thermosetting resin sheet by cutting the surface of the resin block at a certain thickness; and then removing the porogen from the thermosetting resin sheet.

The thermosetting resin that can be used in the present invention includes those capable of forming a porous body with use of a curing agent and a porogen. The thermosetting resin usable in the present invention includes, for example, epoxy resins, phenol resins, melamine resins, urea resins (urea formaldehyde resins), alkyd resins, unsaturated polyester resins, polyurethanes, thermosetting polyimides, silicone resins and diallyl phthalate resins, and among them, epoxy resins are preferably used.

Hereinafter, the present invention will be described with reference to an example of a case where the thermosetting resin is an epoxy resin.

The epoxy resin includes, for example, polyphenyl-based epoxy resins (e.g. bisphenol A type epoxy resin, brominated bisphenol A type epoxy resin, bisphenol F type epoxy resin, bisphenol AD type epoxy resin, stilbene type epoxy resin, biphenyl type epoxy resin, bisphenol A novolac type epoxy resin, cresol novolac type epoxy resin, diaminodiphenylmethane type epoxy resin and tetrakis(hydroxyphenyl)ethane base), fluorene-containing epoxy resins, triglycidyl isocyanurates, aromatic epoxy resins (e.g. heteroaromatic ring (e.g. triazine ring)-containing epoxy resin); and non-aromatic epoxy resins (e.g. aliphatic glycidyl ether type epoxy resin, aliphatic glycidyl ester type epoxy resin, alicyclic glycidyl ether type epoxy resin, alicyclic glycidyl ester type epoxy resin). These epoxy resins may be used alone or in combination of two or more thereof.

Of these, in order to form a uniform three-dimensional structure and uniform pores as well as to secure chemical resistance and membrane strength, it is preferable to use at least one kind of aromatic epoxy resins selected from the group consisting of bisphenol A type epoxy resin, brominated bisphenol A type epoxy resin, bisphenol F type epoxy resin, bisphenol AD type epoxy resin, fluorene-containing epoxy resin and triglycidyl isocyanurate; at least one kind of alicyclic epoxy resins selected from the group consisting of alicyclic glycidyl ether type epoxy resin and alicyclic glycidyl ester type epoxy resin. Particularly, it is preferable to use at least one kind of aromatic epoxy resins each having an epoxy equivalent of 6000 or less and a melting point of 170° C. or less, selected from the group consisting of bisphenol A type epoxy resin, brominated bisphenol A type epoxy resin, bisphenol AD type epoxy resin, fluorene-containing epoxy resin and triglycidyl isocyanurate; at least one kind of alicyclic epoxy resins each having an epoxy equivalent of 6000 or less and a melting point of 170° C. or less, selected from the group consisting of alicyclic glycidyl ether type epoxy resin and alicyclic glycidyl ester type epoxy resin.

The curing agent includes, for example, aromatic curing agents such as aromatic amines (e.g. metaphenylenediamine, diaminodiphenylmethane, diaminodiphenylsulfone, benzyldimethylamine, dimethylaminomethylbenzene), aromatic acid anhydrides (e.g. phthalic anhydride, trimellitic anhydride, pyromellitic anhydride), phenol resins, phenol novolac resins and heteroaromatic ring-containing amines (e.g. triazine ring-containing amine); and non-aromatic curing agents such as aliphatic amines (e.g. ethylenediamine, diethylenetriamine, triethylenetetramine, tetraethylenepentamine, iminobispropylamine, bis(hexamethylene)triamine, 1,3,6-trisaminomethylhexane, polymethylenediamine, trimethylhexamethylenediamine, polyether diamine), alicyclic amines (e.g. isophoronediamine, menthanediamine, N-aminoethylpiperazine, 3,9-bis(3-aminopropyl)2,4,8,10-tetraoxaspiro(5,5)undecane adduct, bis(4-amino-3-methylcyclohexyl)methane, bis(4-aminocyclohexyl)methane and modified product thereof), and aliphatic polyamideamines including polyamines and dimer acids. These curing agents may be used alone or in combination of two or more thereof.

Of these, in order to form a uniform three-dimensional structure and uniform pores as well as to secure membrane strength and elastic modulus, it is preferable to use at least one kind of aromatic amine curing agents each having two or more primary amines in the molecule, selected from the group consisting of metaphenylenediamine, diaminodiphenylmethane and diaminodiphenylsulfone; and at least one kind of alicyclic amine curing agents each having two or more primary amines in the molecule, selected from the group consisting of bis(4-amino-3-methylcyclohexyl) methane and bis(4-aminocyclohexyl)methane.

In addition, a preferable combination of the epoxy resin and the curing agent is a combination of an aromatic epoxy resin and an alicyclic amine curing agent, or a combination of an alicyclic epoxy resin and an aromatic amine curing agent. By using these combinations, heat resistance of the resulting epoxy resin porous sheet becomes higher and thus such a sheet is preferably used as a porous support for the composite semipermeable membranes.

The porogen is a solvent capable of dissolving an epoxy resin and a curing agent as well as capable of causing reaction-induced phase separation after polymerization between the epoxy resin and the curing agent, and examples thereof include cellosolves (e.g. methyl cellosolve, ethyl cellosolve), esters (e.g. ethylene glycol monomethyl ether acetate, propylene glycol monomethyl ether acetate), and glycols (e.g. polyethylene glycol, polypropylene glycol). These solvents may be used alone or in combination of two or more thereof.

Of these, in order to form a uniform three-dimensional structure and uniform pores, it is preferable to use methyl cellosolve, ethyl cellosolve, polyethylene glycol with a molecular weight of 600 or less, ethylene glycol monomethyl ether acetate, propylene glycol monomethyl ether acetate, polypropylene glycol, polyoxyethylene monomethyl ether, and polyoxyethylene dimethyl ether, and it is particularly preferable to use polyethylene glycol with a molecular weight of 200 or less, polypropylene glycol with a molecular weight of 500 or less, polyoxyethylene monomethyl ether and propylene glycol monomethyl ether acetate. These solvents may be used alone or in combination of two or more thereof.

Any solvent that can dissolve the reaction product between the epoxy resin and the curing agent may be used as a porogen even if it is insoluble or hardly soluble in individual epoxy resins or curing agents at normal temperature. Such a porogen includes, for example, brominated bisphenol A type epoxy resins ("EPICOAT 5058" manufactured by Japan Epoxy Resin Co., Ltd.).

It is preferable to select the optimal conditions after drawing a phase diagram of the system in order to obtain the desired porosity, average pore diameter and pore diameter distribution because the porosity, average pore diameter and pore diameter distribution of the epoxy resin porous sheet vary depending on the kind and mixing ratio of raw materials (e.g. epoxy resins, curing agents, porogens) to be used as well as on the reaction conditions such as heating temperature and heating time in the reaction-induced phase separation. In addition, by controlling the molecular weight and molecular weight distribution of the cross-linked epoxy resin, viscosity of the system, and the speed of the cross-linking reaction at the time of phase separation, a stable porous structure can be obtained after fixation of a bicontinuous structure between the cross-linked epoxy resin and the porogen to a specific state.

The kinds and blending ratios of an epoxy resin and a curing agent are preferably determined such that the proportion of aromatic ring-derived carbon atoms to all the carbon atoms constituting an epoxy resin porous sheet is in the range of 0.1 to 0.65. When the above value is less than 0.1, the recognition properties of the plane structure of the separation medium, which is the characteristic of the epoxy resin porous sheet, tend to be decreased. On the other hand, when the above value exceeds 0.65, it becomes difficult to form a uniform three-dimensional structure.

In addition, the blending ratio of a curing agent to an epoxy resin is preferably 0.6 to 1.5 equivalents of the curing agent per one equivalent of an epoxy group. If the curing agent equivalent is less than 0.6, the cross-linking density of the cured product becomes decreased, and heat resistance as well as solvent resistance tends to decrease. On the other hand, if the curing agent equivalent exceeds 1.5, unreacted curing agent tends to remain or to inhibit the enhancement of the cross-linking density. In the present invention, a curing accelerator other than the above-mentioned curing agents may be added to obtain the desired porous structure. The curing accelerators that can be used are well-known substances, including, for example, tertiary amines such as triethylamine and tributylamine, and imidazoles such as 2-phenol-4-methylimidazole, 2-ethyl-4-methylimidazole and 2-phenol-4,5-dihydroxyimidazole.

It is preferable to use a porogen in an amount of 40 to 80% by weight based on the total weight of the epoxy resin, curing agent and porogen so that the average pore diameter of the epoxy resin porous sheet may be adjusted to 0.01 to 0.4 µm. If the amount of the porogen is less than 40% by weight, the average pore diameter becomes too small, or no pores tend to be formed. On the other hand, if the amount of the porogen exceeds 80% by weight, formation of a uniform skin layer on the porous body in the production of a composite semipermeable membrane becomes impossible and salt blocking property tends to remarkably deteriorate because the average pore diameter becomes too large. The average pore diameter of the epoxy resin porous sheet is more preferably 0.05 to 0.2 µm. For that purpose, it is preferable to use a porogen in amount of 60 to 70% by weight, and particularly preferably in an amount of 60 to 65% by weight.

Moreover, as a method of adjusting the average pore diameter of the epoxy resin porous sheet to 0.01 to 0.4 µm, it is also suitable to mix two or more epoxy resins each having a different epoxy equivalent and to use them. In that case, the difference in epoxy equivalent weights is 100 or more, and it is preferable to mix an epoxy resin that is liquid at normal temperature with an epoxy resin that is solid at normal temperature and then use the mixture.

In addition, the average pore diameter of the epoxy resin porous sheet can be adjusted within a target range by appropriately setting various conditions such as the ratio of the entire epoxy equivalents to the porogen and the curing temperature.

The cylindrical or columnar resin block can be produced, for example, by filling the epoxy resin composition into a cylindrical or columnar mold, and then crosslinking the epoxy resin under optional heating so that a three-dimensional crosslinkage is formed. In that case, a bicontinuous structure is formed due to the phase separation between the epoxy resin crosslinked product and the porogen. In addition, a cylindrical resin block may be produced by forming a columnar resin block with use of a columnar mold and then punching the center of the block.

Although the temperature and time in curing the epoxy resin composition will vary depending on the kinds of an epoxy resin and a curing agent, the temperature is usually about 15 to 150° C. and the time is usually about 10 minutes to 72 hours. Curing at room temperature is particularly preferable for the formation of uniform pores, and the initial curing temperature is preferably about 20 to 40° C. and the curing time is preferably about 1 to 48 hours. After the curing treatment, a post-cure (post-treatment) may be performed so as to increase the crosslinking degree of the crosslinked epoxy resin product. The conditions for the post-cure are not particularly limited, but the temperature is room temperature or within a range of about 50 to 160° C., and the time is about 2 to 48 hours.

The thickness of the cylindrical resin block is not particularly limited, but it is preferably 5 cm or more, and more preferably 10 cm or more, from the viewpoint of production efficiency of the porous epoxy resin sheet. Although the diameter of the columnar resin block is not particularly limited, it is preferably 30 cm or more, and more preferably 40 to 150 cm, from the viewpoint of production efficiency of the porous epoxy resin sheet. In addition, the width (axial length) of the block, which can be suitably set taking into consideration of the size of the objective porous epoxy resin sheet, is usually 20 to 200 cm, and preferably 30 to 150 cm and more preferably 50 to 120 cm, from the viewpoint of ease of handling.

Thereafter, a long epoxy resin sheet is produced by cutting the surface of the cylindrical or columnar resin block at a certain thickness while rotating the block around the cylindrical or columnar axis.

FIG. 1 is a schematic view showing a step to slice a cylindrical resin block 1 using a slicer 2. The line speed at the time of slicing is, for example, about 2 to 50 m/min.

The thickness of an epoxy resin sheet 4 is not particularly limited, but it is preferably 50 to 500 μm and more preferably 100 to 200 μm from the viewpoint of strength and ease of handling.

In addition, the length of the epoxy resin sheet 4 is not particularly limited, but such a length is preferably 100 m or more, and more preferably 1000 m or more, from the viewpoint of production efficiency of a porous epoxy resin sheet.

Thereafter, a porous epoxy resin sheet having pores connected with each other is produced by removing the porogen contained in the epoxy resin sheet.

Examples of a solvent used for removing the porogen from the epoxy resin sheet include water, DMF (N,N-dimethylformamide), DMSO (dimethyl sulfoxide), THF (tetrahydrofuran) and mixtures thereof, and these solvents are appropriately selected depending on the kind of the porogen used. Moreover, supercritical fluids such as water and carbon dioxide can also be preferably used.

After removing the porogen, the porous epoxy resin sheet may be subjected to a drying treatment, etc. The drying conditions are not particularly limited, but the temperature is usually about 40 to 120° C., preferably about 50 to 80° C., and the drying time is about 3 minutes to 3 hours.

In the case where a composite semipermeable membrane is produced by forming a skin layer on the surface of the porous epoxy resin sheet, an atmospheric pressure plasma treatment or alcohol treatment may be applied to the surface side where a skin layer of the porous epoxy resin sheet is formed, before forming the skin layer on the surface of the porous epoxy resin sheet. By applying the atmospheric pressure plasma treatment or alcohol treatment to the surface side where a skin layer of the porous epoxy resin sheet is formed, thereby to modify the surface (for example, enhancement of the hydrophilicity and increase of the surface coarseness), a composite semipermeable membrane can be produced, wherein the adhesion of the porous epoxy resin sheet and the skin layer is enhanced and the floating of the skin layer (a phenomenon wherein the skin layer swells like a semicircle as a result of the fact that water penetrates between the porous epoxy resin sheet and the skin layer) is hardly caused.

It is preferable to perform the atmospheric pressure plasma treatment under an atmosphere in the presence of a nitrogen gas, an ammonia gas, or a noble gas (such as helium or argon) at a discharge strength of about 0.1 to 5 Wsec/cm$^2$. In addition, it is preferable to perform the alcohol treatment by application of an aqueous solution containing 0.1 to 90% by weight of a monovalent alcohol such as methyl alcohol, ethyl alcohol, n-propyl alcohol, isopropyl alcohol, or t-butyl alcohol, or immersion in the aqueous solution.

The thickness of the porous epoxy resin sheet is not particularly limited, but it is preferably about 20 to 1000 μm in view of the strength, and when the sheet is used as a porous support for a composite semipermeable membrane, the thickness is preferably 50 to 250 μm, and more preferably 80 to 150 μm, from the viewpoint of practical water permeability and salt blocking property. In addition, the back side of the porous epoxy resin sheet may be reinforced with a woven fabric or a nonwoven fabric.

When the porous epoxy resin sheet is used as a porous support for a composite semipermeable membrane, the average pore diameter as estimated by the mercury porosimetry method is preferably 0.01 to 0.4 μm, and more preferably 0.05 to 0.2 μm. If the average pore diameter is too large, it is difficult to form a uniform skin layer, and if the average pore diameter is too small, the performance of the composite semipermeable membrane tends to be impaired. In addition, the porosity is preferably 20 to 80% and more preferably 30 to 60%.

Hereinafter, described is a method for producing a composite semipermeable membrane wherein a skin layer is formed on the surface of the above-mentioned porous epoxy resin sheet.

The material of forming a skin layer is not particularly limited, and includes, for example, cellulose acetate, ethyl cellulose, polyether, polyester and polyamide.

In the present invention, it is preferred that a skin layer includes a polyamide-based resin obtained through polymerization between a polyfunctional amine component and a polyfunctional acid halide component.

The polyfunctional amine component is defined as a polyfunctional amine having two or more reactive amino groups, and includes aromatic, aliphatic, and alicyclic polyfunctional amines.

The aromatic polyfunctional amines include, for example, m-phenylenediamine, p-phenylenediamine, o-phenylenediamine, 1,3,5-triamino benzene, 1,2,4-triamino benzene, 3,5-diaminobenzoic acid, 2,4-diaminotoluene, 2,6-diaminotoluene, N,N'-dimethyl-m-phenylenediamine, 2,4-diaminoanisole, amidol, xylylene diamine etc.

The aliphatic polyfunctional amines include, for example, ethylenediamine, propylenediamine, tris(2-aminoethyl) amine, n-phenylethylenediamine, etc.

The alicyclic polyfunctional amines include, for example, 1,3-diaminocyclohexane, 1,2-diaminocyclohexane, 1,4-diaminocyclohexane, piperazine, 2,5-dimethylpiperazine, 4-aminomethyl piperazine, etc.

These polyfunctional amines may be used independently, and two or more kinds may be used in combination. In order to obtain a skin layer having a higher salt-blocking property, it is preferred to use the aromatic polyfunctional amines.

The polyfunctional acid halide component represents polyfunctional acid halides having two or more reactive carbonyl groups.

The polyfunctional acid halides include aromatic, aliphatic, and alicyclic polyfunctional acid halides.

The aromatic polyfunctional acid halides include, for example trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, chlorosulfonyl benzenedicarboxylic acid dichloride etc.

The aliphatic polyfunctional acid halides include, for example, propanedicarboxylic acid dichloride, butane dicarboxylic acid dichloride, pentanedicarboxylic acid dichloride, propane tricarboxylic acid trichloride, butane tricarboxylic acid trichloride, pentane tricarboxylic acid trichloride, glutaryl halide, adipoyl halide etc.

The alicyclic polyfunctional acid halides include, for example, cyclopropane tricarboxylic acid trichloride, cyclobutanetetracarboxylic acid tetrachloride, cyclopentane tricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, tetrahydrofuran dicarboxylic acid dichloride, etc.

These polyfunctional acid halides may be used independently, and two or more kinds may be used in combination. In order to obtain a skin layer having higher salt-blocking property, it is preferred to use aromatic polyfunctional acid halides. In addition, it is preferred to form a cross linked structure using polyfunctional acid halides having trivalency or more as at least a part of the polyfunctional acid halide components.

Furthermore, in order to improve performance of the skin layer including the polyamide resin, polymers such as polyvinyl alcohol, polyvinylpyrrolidone, and polyacrylic acids etc., and polyhydric alcohols, such as sorbitol and glycerin may be copolymerized.

Processes for forming the skin layer including the polyamide resin on the surface of the epoxy resin porous sheet is not in particular limited, and any publicly known methods may be used. For example, the publicly known methods include an interfacial condensation method, a phase separation method, a thin film application method, etc. The interfacial condensation method is a method, wherein an amine aqueous solution containing a polyfunctional amine component, an organic solution containing a polyfunctional acid halide component are forced to contact together to form a skin layer by an interfacial polymerization, and then the obtained skin layer is laid on an epoxy resin porous sheet, and a method wherein a skin layer of a polyamide resin is directly formed on an epoxy resin porous sheet by the above-described interfacial polymerization on an epoxy resin porous sheet. Details, such as conditions of the interfacial condensation method, are described in Japanese Patent Application Laid-Open No. 58-24303, Japanese Patent Application Laid-Open No. 01-180208, and these known methods are suitably employable.

In the present invention, a method is especially preferable in which a covering layer of aqueous solution made from the amine aqueous solution containing a polyfunctional amine component is formed on the porous epoxy resin sheet, and subsequently an interfacial polymerization is performed by contact of an organic solution containing a polyfunctional acid halide component with the covering layer of aqueous solution, and then a skin layer is formed.

In the interfacial polymerization method, although the concentration of the polyfunctional amine component in the amine aqueous solution is not in particular limited, the concentration is preferably 0.1 to 5% by weight, and more preferably 1 to 4% by weight. Less than 0.1% by weight of the concentration of the polyfunctional amine component may easily cause defect such as pinhole. in the skin layer, leading to tendency of deterioration of salt-blocking property. On the other hand, the concentration of the polyfunctional amine component exceeding 5% by weight allows to be an excessively large thickness and to raise the permeation resistance, likely giving deterioration of the permeation flux.

Although the concentration of the polyfunctional acid halide component in the organic solution is not in particular limited, it is preferably 0.01 to 5% by weight, and more preferably 0.05 to 3% by weight. Less than 0.01% by weight of the concentration of the polyfunctional acid halide component is apt to make the unreacted polyfunctional amine component remain, to cause defect such as pinhole in the skin layer, leading to tendency of deterioration of salt-blocking property. On the other hand, the concentration exceeding 5% by weight of the polyfunctional acid halide component is apt to make the unreacted polyfunctional acid halide component remain, to be an excessively large thickness and to raise the permeation resistance, likely giving deterioration of the permeation flux.

The organic solvents used for the organic solution is not especially limited as long as they have small solubility to water, and do not cause degradation of the porous epoxy resin sheet, and dissolve the polyfunctional acid halide component. For example, the organic solvents include saturated hydrocarbons, such as cyclohexane, heptane, octane, and nonane, halogenated hydrocarbons, such as 1,1,2-trichlorofluoroethane, etc. They are preferably saturated hydrocarbons having a boiling point of 300° C. or less, and more preferably 200° C. or less.

Various kinds of additives may be added to the amine aqueous solution or the organic solution in order to provide easy film production and to improve performance of the composite semipermeable membrane to be obtained. The additives include, for example, surfactants, as such sodium dodecylbenzenesulfonate, sodium dodecyl sulfate, and sodium lauryl sulfate; basic compounds, such as sodium hydroxide, trisodium phosphate, triethylamine, etc. for removing hydrogen halides formed by polymerization; acylation catalysts; compounds having a solubility parameter of 8 to 14 $(cal/cm^3)^{1/2}$ described in Japanese Patent Application Laid-Open No. 08-224452.

The period of time after application of the amine aqueous solution until application of the organic solution on the porous epoxy resin sheet is preferably 180 seconds or less, more preferably 120 seconds or less, depending on the composition and viscosity of the amine aqueous solution, and on the pore diameter of the surface of the porous epoxy resin sheet. When an application interval of the above solution is too long, the amine aqueous solution permeates and diffuses deeply into the internal portion of the porous epoxy resin sheet, and a large amount of unreacted polyfunctional amine components might remain in the porous epoxy resin sheet. In addition, the unreacted polyfunctional amine components that have permeated deeply into the internal portion of the porous epoxy resin sheet tend to be hard to be removed even by the subsequent membrane washing processing. In addition, after coating the porous epoxy resin sheet with the amine aqueous solution, an excess amine aqueous solution may be removed.

In the present invention, after a covering layer of aqueous solution made from the amine aqueous solution is contacted with an organic solution, it is preferred to remove the excessive organic solution on the porous epoxy resin sheet, and dry the formed membrane on the porous epoxy resin sheet by heating at 70° C. or more, thereby to form a skin layer. The heat treatment of the formed membrane can improve its mechanical strength and heat resistance. The heating temperature is more preferably 70° C. to 200° C., and particularly preferably 80 to 130° C. The heating period of time is preferably about 30 seconds to 10 minutes, and more preferably about 40 seconds to 7 minutes.

The thickness of the skin layer formed on the porous epoxy resin sheet is not particularly limited, but it is usually 0.05 to 2 µm, preferably 0.1 to 1 µm.

The shape of the composite semipermeable membrane of the present invention is not limited at all. That is, the composite semipermeable membrane can take all possible membrane shapes, such as flat membrane shapes and spiral element shapes. In addition, various conventionally known treatments may be applied to the composite semipermeable membrane in order to improve the salt-blocking property, water permeability, resistance against oxidizing agents, and the like. A salt blocking rate of a composite semipermeable membrane having a skin layer containing a polyamide-based resin is preferably 98% or more, and more preferably 99% or more. In addition, the composite semipermeable membrane having a permeation flux of 0.8 m³/cm²·d or more can be preferably used.

Moreover, in the present invention, a dry type of composite semipermeable membrane may be made in view of superiority in processability and preservability. When drying treatment is carried out, the shape of the semipermeable membrane is not limited at all. That is, drying treatment is possible in all possible membrane shapes including flat membrane shapes or spiral element shapes. For example, a membrane unit is formed by processing a semipermeable membrane into a spiral shape, and a dry spiral element is formed by drying the membrane unit.

EXAMPLES

The present invention will, hereinafter, be described with reference to Examples, but the present invention is not limited at all by these Examples.
[Evaluation and Measuring Method]
(Measurement of Porosity and Average Pore Diameter of Porous Epoxy Resin Sheet)

The porosity and average pore diameter of a porous epoxy resin sheet was measured by a mercury intrusion porosimetry using an AutoPore 9520 manufactured by Shimadzu Corporation.

Further, a median diameter under the condition of an initial pressure of 7 kPa was adopted as the average pore diameter.
(Measurement of Permeation Flux and Salt-Blocking Rate)

The produced composite semipermeable membrane with a shape of a flat film is cut into a predetermined shape and size, and is set to a cell for flat film evaluation. An aqueous solution containing NaCl of about 1500 mg/L and adjusted to a pH of 6.5 to 7.5 with NaOH was forced to contact to a supply side, and a permeation side of the membrane at a differential pressure of 1.5 Mpa at 25° C. A permeation velocity and an electric conductivity of the permeated water obtained by this operation were measured for, and a permeation flux (m³/m²·d) and a salt-blocking rate (%) were calculated. The correlation (calibration curve) of the NaCl concentration and the electric conductivity of the aqueous solution was beforehand made, and the salt-blocking rate was calculated by a following equation. Salt-blocking rate (%)={1−(NaCl concentration [mg/L] in permeated liquid)/(NaCl concentration [mg/L] in supply solution)}×100

Example 1

Production of Porous Epoxy Resin Sheet

Into a vessel were charged 139 parts by weight of a bisphenol-A type epoxy resin (EPICOAT 828, manufactured by Japan Epoxy Resin Co., Ltd.), 93.2 parts by weight of a bisphenol-A type epoxy resin (EPICOAT 1010, manufactured by Japan Epoxy Resin Co., Ltd.), 52 parts by weight of bis(4-amino-cyclohexyl)methane and 500 parts by weight of polyethylene glycol 200 (manufactured by Sanyo Chemicals Industries, Ltd.), and the mixture was stirred at 400 rpm for 15 minutes using a three-one motor to obtain an epoxy resin composition.

The prepared epoxy resin composition was filled in a cylindrical mold (outside diameter: 35 cm, inside diameter: 10.5 cm) to a height of 30 cm, and subjected to room temperature curing at 25° C. for 12 hours, and reacted for curing at 130° C. for 18 hours, thereby to produce a cylindrical resin block. Afterwards, the surface of the block was continuously sliced at a thickness of 150 µm with a cutting device (manufactured by Toshiba Machine Co., Ltd.) while rotating the block around the cylindrical axis, thereby to obtain a long epoxy resin sheet (length: 150 m). Then, the epoxy resin sheet was immersed in water for 12 hours to remove polyethylene glycol, thereby obtaining a porous epoxy resin sheet. Afterwards, the porous epoxy resin sheet was dried for about 4 hours in a dryer at 50° C. For the dried porous epoxy resin sheet, the thickness was 145 µm, the porosity was 45%, and the average pore diameter was 0.106

Production of Composite Semipermeable Membrane

An amine aqueous solution containing 3% by weight of m-phenylenediamine, 3% by weight of triethylamine, and 6% by weight of camphorsulfonic acid was applied onto the porous epoxy resin sheet, and an excessive amount of the amine aqueous solution was removed by wiping to form a coating layer of the aqueous solution. Subsequently, an isooctane solution containing 0.2% by weight of trimesic acid chloride was applied to the surface of the coating layer of the aqueous solution. Subsequently, an excessive solution was removed, the resultant was kept standing for 3 minutes in a hot air dryer at 120° C. to form a skin layer containing a polyamide-based resin on the porous epoxy resin sheet, and thus a composite semipermeable membrane was produced. The permeation test as mentioned above was performed using the produced composite semipermeable membrane. As a result of the permeation test, the salt-blocking rate was 99.0(%) and the permeation flux was 0.9 ($m^3/m^2 \cdot d$).

Example 2

A porous epoxy resin sheet was produced in the same manner as in Example 1, except that a cylindrical resin block was produced by curing at 60° C. for 3 hours and then at 130° C. for 15 hours. For the dried porous epoxy resin sheet, the thickness was 148 µm, the porosity was 48%, and the average pore diameter was 0.08 µm. A composite semipermeable membrane was produced in the same manner as in Example 1, except that said porous epoxy resin sheet was used, and then the above permeation test was carried out. As a result of the permeation test, the salt-blocking rate and the permeation flux were comparable with those in Example 1.

Example 3

A porous epoxy resin sheet was produced in the same manner as in Example 1, except that a cylindrical resin block was produced by curing at 60° C. for 3 hours, then at 130° C. for 13 hours, and further at 160° C. for 2 hours. For the dried porous epoxy resin sheet, the thickness was 141 µm, the porosity was 42%, and the average pore diameter was 0.09 µm. A composite semipermeable membrane was produced in the same manner as in Example 1, except that said porous epoxy resin sheet was used, and then the above permeation test was carried out. As a result of the permeation test, the salt-blocking rate and the permeation flux were comparable with those in Example 1.

Example 4

Production of Porous Epoxy Resin Sheet

A release agent (QZ-13, manufactured by Nagase ChemteX Corporation) was thinly applied to inside of a 5 L-stainless steel container, and the stainless container was dried in a dryer that had been set to 40 to 100° C. In 3087.2 g of polyethylene glycol (brand name "PEG200", manufactured by Sanyo Chemical Industries, Ltd.) were dissolved 1094.6 g of Bisphenol A type epoxy resin (brand name "jER827", manufactured by Japan Epoxy Resin Co. Ltd.), 156.4 g of bisphenol A type epoxy resin (brand name "jER1001", manufactured by Japan Epoxy Resin Co. Ltd.), and 312.8 g of bisphenol A type epoxy resin (brand name "jER1009", manufactured by Japan Epoxy Resin Co. Ltd.) to prepare an epoxy resin/polyethylene glycol solution. Then, the epoxy resin/polyethylene glycol solution prepared was charged into the stainless steel container. Thereafter, 349 g of 4,4'-dicyclohexyldiamine (brand name "PACM-20", manufactured by DKSH Holding Ltd.) was charged into the stainless steel container. Using a three-one motor, the mixture was stirred at 300 rpm for 30 minutes with an anchor wing. Then, using a vacuum cup (AZONE VZ type), the mixture was defoamed under vacuum until foams disappeared under a pressure of about 0.1 MPa. After allowing the product to stand for about 2 hours, stirring was again carried out for about 30 minutes using a three-one motor to effect defoaming again under vacuum. Then, the defoamed product was allowed to stand at 25° C. for 24 hours, resulting in curing. Subsequently, a second curing was carried out with a hot air circulating dryer set to 80° C. for 24 hours. An epoxy resin block was taken out from the stainless steel container and sliced at a thickness of 100 to 150 µm using a cutting lathe to obtain an epoxy resin sheet. The epoxy resin sheet was washed with purified water to remove polyethylene glycol, and then dried at 70° C. for 2 minutes, at 80° C. for 1 minute and at 90° C. for 1 minute to produce a porous epoxy resin sheet. After that, the produced porous epoxy resin sheet was immersed in 20 wt % aqueous solution of isopropyl alcohol for 10 minutes so that a hydrophilic treatment was performed.

Production of Composite Semipermeable Membrane

Figure 2:
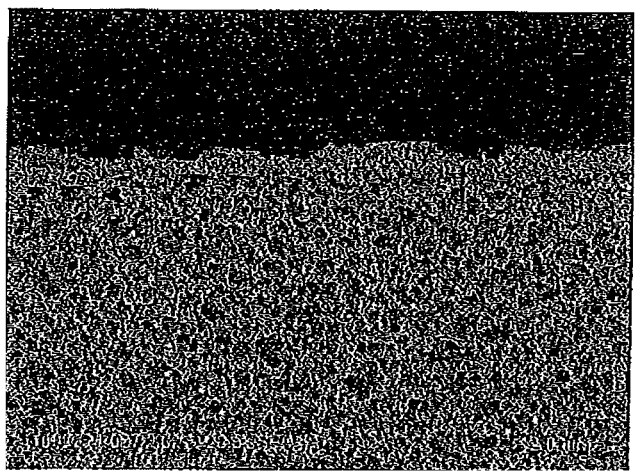
FIG. 2 shows a cross-sectional SEM photograph (20000×) of the composite semipermeable membrane obtained in Example 4.

Using a porous epoxy resin sheet to which a hydrophilic treatment was applied, a composite semipermeable membrane was produced in the same manner as in Example 1. A permeation test was carried out using the produced composite semipermeable membrane. As a result of the permeation test, the salt-blocking rate was 99.5(%) and the permeation flux was 0.9 ($m^3/m^2 \cdot d$). Moreover, FIG. 2 shows the scanning electron microscope (SEM) photograph (20,000 times) of the cross-section of the composite semipermeable membrane after the permeation test. It is found that a skin layer is formed without defects on the porous epoxy resin sheet.

Example 5

Figures 1, 3:
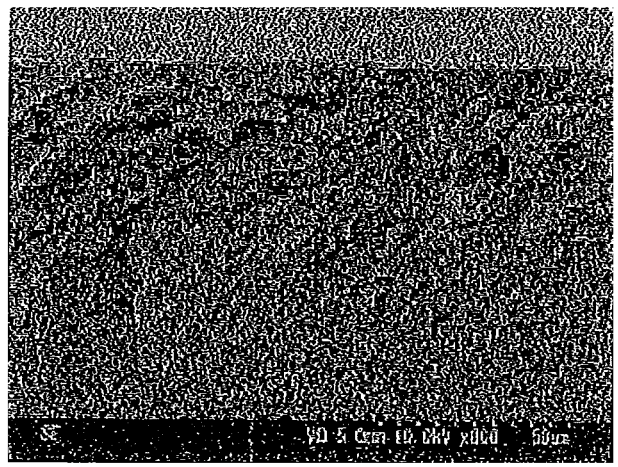
Figures 2, 3:
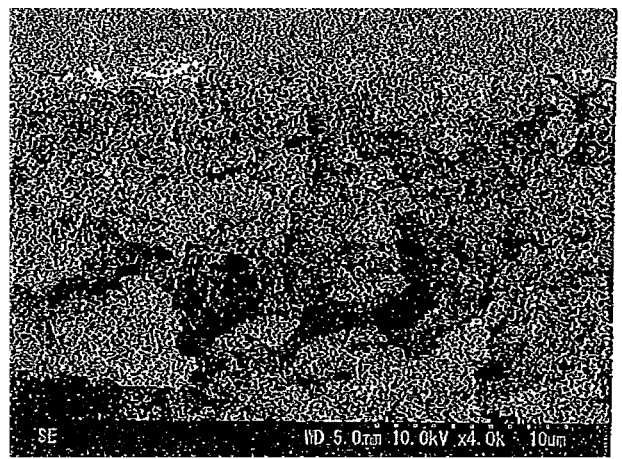

A porous epoxy resin sheet to which a hydrophilic treatment was applied was produced in the same manner as in Example 4, except that 3355.7 g of polypropylene glycol (brand name "D-250", manufactured by NOF Corporation) was used in place of 3087.2 g of polyethylene glycol (brand name "PEG200", manufactured by Sanyo Chemical Industries, Ltd.). A composite semipermeable membrane was produced in the same manner as in Example 1, using the obtained porous epoxy resin sheet. A permeation test was carried out using the formed composite semipermeable membrane. As a result of the permeation test, the salt-blocking rate was 99.3(%) and the permeation flux was 0.9 ($m^3/m^2 \cdot d$). Moreover, the scanning electron microscope (SEM) photographs (800 times, 4,000 times) of the cross-section of the composite semipermeable membrane after the permeation test are shown in FIGS. 3-1 and 3-2. It is found that a skin layer is formed without defects on the porous epoxy resin sheet.

INDUSTRIAL APPLICABILITY

The porous thermosetting resin sheet of the present invention is used as a separation membrane or a support for a composite semipermeable membrane. In addition, the composite semipermeable membrane of the present invention is used for production of ultrapure water, desalination of brine water or sea water, etc., and is also used for the case of removing or recovering pollution sources or effective substances from pollution, which causes environment pollution occurrence, such as dyeing drainage and electrodeposition paint drainage, and closing drainage. Furthermore, such a membrane is used for concentration of active ingredients in foodstuffs usage, and for removal of harmful components in water purification or sewage usage etc.

EXPLANATION OF THE SYMBOLS

1: Cylindrical resin block
2: Slicer
3: Rotation Axis
4: Epoxy Resin Sheet

The invention claimed is:

1. A method for producing a porous thermosetting resin sheet, comprising:
   forming a cylindrical or columnar resin block that is composed of a cured product of a thermosetting resin composition containing a thermosetting resin, a curing agent and a porogen;
   forming a long thermosetting resin sheet by cutting the surface of said resin block at a certain thickness; and
   then removing the porogen from the thermosetting resin sheet so as to form pores.

2. The method for producing a porous thermosetting resin sheet according to claim 1, wherein said cutting is carried out while rotating the cylindrical or columnar resin block around the cylindrical or columnar axis.

3. The method for producing a porous thermosetting resin sheet according to claim 1, wherein the thermosetting resin is an epoxy resin.

4. The method for producing a porous thermosetting resin sheet according to claim 3, wherein a combination of the epoxy resin and the curing agent is a combination of an aromatic epoxy resin and an alicyclic amine curing agent, or a combination of an alicyclic epoxy resin and an aromatic amine curing agent.

5. The method for producing a porous thermosetting resin sheet according to claim 3, wherein an amount of the porogen is 40 to 80% by weight based on the total weight of the epoxy resin, the curing agent and the porogen.

6. The method for producing a porous thermosetting resin sheet according to claim 5, wherein the epoxy resin contains two or more epoxy resins each having a different epoxy equivalent.

7. The method for producing a porous thermosetting resin sheet according to claim 5, wherein an epoxy resin composition is cured at 15 to 150° C., and then is post-cured at 50 to 160° C. to form the cured product.

8. The method for producing a porous thermosetting resin sheet according to claim 3, wherein the epoxy resin contains two or more epoxy resins each having a different epoxy equivalent.

9. The method for producing a porous thermosetting resin sheet according to claim 8, wherein an epoxy resin composition is cured at 15 to 150° C., and then is post-cured at 50 to 160° C. to form the cured product.

10. The method for producing a porous thermosetting resin sheet according to claim 3, wherein an epoxy resin composition is cured at 15 to 150° C., and then is post-cured at 50 to 160° C. to form the cured product.

11. The method for producing a porous thermosetting resin sheet according to claim 1, wherein the porogen is polyethylene glycol.

12. A porous thermosetting resin sheet produced by the method according to claim 1, having pores connected with each other, and wherein the average pore diameter is 0.01 to 0.4 μm.

13. A composite semipermeable membrane, wherein a skin layer is formed on the surface of the porous thermosetting resin sheet according to claim 12.

14. The composite semipermeable membrane according to claim 13, wherein the skin layer contains a polyamide-based resin.

15. The porous thermosetting resin sheet according to claim 12, wherein the average pore diameter is 0.05 to 0.2 μm.

16. The porous thermosetting resin sheet according to claim 12, wherein a thickness of the porous thermosetting resin sheet is 50 to 500 μm.

17. The porous thermosetting resin sheet according to claim 12, wherein a thickness of the porous thermosetting resin sheet is 50 to 200 μm.

18. The method for producing a porous thermosetting resin sheet according to claim 1, wherein an amount of the porogen is 60 to 70% by weight based on the total weight of the epoxy resin, the curing agent and the porogen.

19. The method for producing a porous thermosetting resin sheet according to claim 1, wherein a width (axial length) of the cylindrical or columnar resin block is 20 to 200 cm.

20. The method for producing a porous thermosetting resin sheet according to claim 1, further comprising:
    drying the porous thermosetting resin sheet at 40 to 120° C. after removing the porogen.

21. The method for producing a porous thermosetting resin sheet according to claim 1, wherein the porogen is polypropylene glycol with a molecular weight of 500 or less.

* * * * *